United States Patent [19]

Furrey

[11] 3,877,067

[45] Apr. 8, 1975

[54] PEAK CHROMA CONTROL CIRCUIT

[75] Inventor: John H. Furrey, Schaumburg, Ill.

[73] Assignee: Warwick Electronics Inc., Chicago, Ill.

[22] Filed: Mar. 26, 1973

[21] Appl. No.: 344,546

[52] U.S. Cl. .................................................. 358/27
[51] Int. Cl. ............................................ H04n 9/48
[58] Field of Search ............................... 178/5.4 AC

[56] References Cited

UNITED STATES PATENTS 3,740,462 6/1973 Harwood........................ 178/5.4 AC

*Primary Examiner*—Robert L. Griffin
*Assistant Examiner*—George G. Stellar
*Attorney, Agent, or Firm*—Wegner, Stellman, McCord, Wiles & Wood

[57] ABSTRACT

An Automatic Chroma Control Circuit for a color television receiver includes an integrated circuit chroma amplifier having a gain controlled by a DC voltage at a bias input. The output of the chroma amplifier is coupled through a chroma bandpass filter to the base of a transistor. A diode-resistor biasing network drives the transistor conductive in proportion to positive peaks of the chroma signal. A capacitor means in shunt with the transistor develops a proportional DC voltage. A switch selectively connects the transistor chroma control to the bias input and in shunt with a manual chroma control potentiometer, restricting the range of the manual chroma control.

6 Claims, 1 Drawing Figure

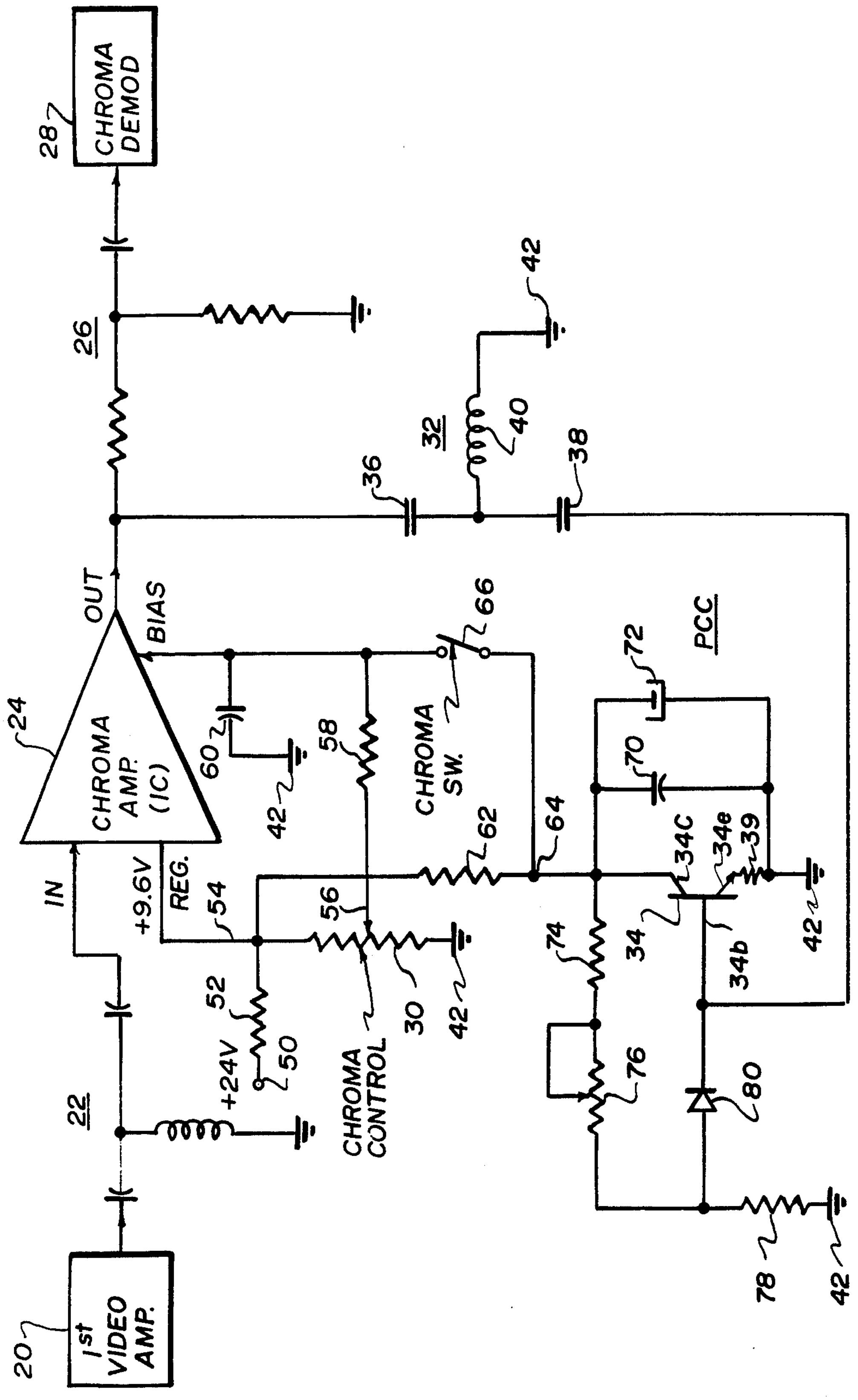
1st VIDEO AMP.
CHROMA AMP. (IC)
IN
OUT
BIAS
+9.6V REG.
+24V
CHROMA CONTROL
CHROMA SW.
CHROMA DEMOD
PCC

PEAK CHROMA CONTROL CIRCUIT

BACKGROUND OF THE INVENTION

This invention relates to a peak chroma control (PCC) circuit for controlling the gain of the chroma channel of a color television receiver.

Several types of automatic chroma control (ACC) circuits are known, some of which control the gain of a chroma channel by the amplitude of the color synchronizing burst, and others of which use the amplitude of the amplified chroma component of a composite television signal. In a peak chroma control (PCC) circuit, the gain of the chroma channel is automatically controlled by the peak of the amplified chroma component, as shown for example in U.S. Pat. No. 3,141,064 to Macovski. The Macovski circuit peak detects the amplifed chroma signal by means of a diode coupled to a positive delay voltage. The detected peaks are then filtered by an integrating circuit to provide a DC gain signal for the chroma channel, having a magnitude inversely related to the peaks of the amplified chroma component.

In color television receivers using semiconductor devices including transistors and integrated circuits (ICs), the developed ACC voltage has been variously applied to semiconductor devices to control the AC gain of the chroma amplifier. For example, a DC voltage from an ACC circuit has been applied to a transistor forming a part of a differential chroma amplifier, as shown for example in U.S. Pat. No. 3,637,924 to Cecchin.

It would be desirable to provide a peak chroma control which is especially adapted for AC gain control of an integrated circuit (IC) chroma amplifier. Such a peak chroma control should be noise immune and should include DC restoration means to control the stability of the PCC circuit. In IC chroma amplifiers, the degree of manual chroma control is generally of undesirably wide range. It would be desirable to have a peak chroma control circuit which limits the range of the manual chroma control.

SUMMARY OF THE INVENTION

In accordance with the present invention, the disadvantages of prior peak chroma control circuits have been overcome. The amplified chroma output from an IC chroma amplifier is passed through a bandpass filter to a transistor driven by the peaks of the amplified chroma output. A setup control establishes the level of the peaks and stabilizes the operation of the transistor. The resulting high frequency current is filtered by a capacitor and used to DC bias the IC chroma amplifier. The peak chroma control may be located in shunt with the manual chroma control potentiometer, effectively forming a shunt regulator which limits the range of control of the manual chroma control.

One object of the present invention is the provision of an improved automatic chroma control circuit in which the peaks of a chroma output signal directly drives a semiconductor device which develops a DC gain control voltage. The circuit includes noise filtering and adjustable DC bias means for stabilizing the operation of the semiconductor device. The peak chroma control may also limit the range of a manual chroma control.

Other features and advantages of the invention will be apparent from the following description, and from the drawings. While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

BRIEF DESCRIPTION OF THE DRAWING

The single FIGURE shows a partly block and partly schematic diagram of the chroma channel of a color television receiver, including a novel peak chroma control circuit.

DESCRIPTION OF THE PREFERRED EMBODIMENT

Turning to the single FIGURE, a color television receiver includes conventional stage (not illustrated) for detecting a composite color television signal. A first video amplifier 20 develops a first video output signal which includes a chroma component and a reference burst component at approximately 3.58 megahertz. The first video output signal is coupled through a chroma bandpass filter 22 to a chroma processing channel including a chroma amplifier 24. The chroma amplifier 24 comprises as integrated circuit (IC) amplifier formed on an independent chip, or formed as part of a chip including other portions of the chroma processing circuitry. In response to an input signal at IN, the chroma amplifier 24 develops at an output OUT an amplified chroma signal without the burst component. The amplified chroma signal is coupled through a network 26 to a chroma demodulator 28 which develops three color or color difference signals for coupling to the image reproduction device. The gain of IC chroma amplifier 24 is controlled by a DC voltage at a Bias input, with a DC voltage of increased positive potential increasing the AC gain of the chroma amplifer 24. Inversely, a DC voltage of lesser positive potential decreases the AC gain of the chroma channel.

Gain control for the chroma channel is provided by a peak chroma control (PCC) circuit, and by a manual Chroma Control 30. The PCC includes a chroma bandpass filter 32 for coupling the output of the chroma amplifier to a controllable semiconductor device operating in its linear range, such an an NPN transistor 34. The chroma bandpass filter includes a pair of 47 picofarad capacitors 36 and 38 in series between the terminal OUT of the chroma amplifier and the control or base electrode **34*b* of the transistor 34. The filter 32 includes a 47 microhenry inductor 40 coupled between the junction of capacitors 36 and 38, and a source 42 of ground reference potential. A reference or emitter electrode 34e is coupled directly to ground 42 by means of resistor 39. Thus, the driving signal in the form of positive peaks of the AC chroma signal are applied between the base 34*b* and emitter 34*e*** electrodes.

Regulated DC voltage for the manual Chroma Control 30 and the PCC is provided by a regulator circuit within the IC chroma amplifier 24. A DC supply 50 of +24 volts is coupled through a dropping resistor 52 to a regulating input line 54 of the chroma amplifier 24.

The integrated circuit within the chroma amplifier includes a regulating circuit which maintains line 54 at +9.6 volts regardless of load fluctuations. Any known regulating circuit may be utilized to provide this function within the IC chip.

The regulated supply line 54 is coupled to one side of the Chroma Control potentiometer 30, having a fixed resistance such as 2.5 kilohms located between the regulated supply line 54 and ground 42. The wiper 56 of potentiometer 30 is coupled through a 10 kilohm resistor 58 to the Bias input for the chroma amplifier 24. A 0.01 microfarad capacitor 60 AC couples the Bias input line to ground 42.

The regulated supply line 54 is also coupled through a 3.3 kilohm resistor 62 to a gain control junction 64 in the PCC. When the PCC is to be enabled, a single pole, single throw Chroma Switch (SW) 66 is closed to coupled junction 64 to the Bias input of the chroma amplifier. Junction 64 is coupled directly to the output or collector electrode 34*c* of the transistor 34. The junction 64 and the collector electrode 34*c* are shunted to ground 42 through an integrating network such as a 0.01 microfarad capacitor 70 in parallel with a 10 microfarad electrolytic capacitor 72.

To bias transistor 34, a biasing and peak control network includes a 1.8 kilohm resistor 74, a 20 kilohm variable resistor 76, and a 820 ohm resistor 78 in series between junction 64 and ground 42. The junction between resistors 76 and 78 is coupled to the anode of a semi-conductor diode 80 having its cathode coupled directly to base 34*b* and to one side of capacitor 38 in filter 32.

When Chroma SW 66 is open, the manual Chroma Control 30 is effective to control the gain of the chroma channel. As wiper 56 is moved towards the regulating supply line 54, a positive DC voltage of increased magnitude is coupled to the Bias input, increasing the AC gain of the Chroma amplifier 24.

The operation of the peak chroma control PCC when Chroma SW 66 is closed is as follows. The chroma signal absent the burst component, on the OUT line of the chroma amplifier, is coupled through bandpass filter 32 which serves to filter out any noise component. The series blocking capacitors 36 and 38 pass only an AC chroma signal to base 34*b*. Variable resistor 76 functions as a Set-Up control which adjusts the DC voltage at the anode of diode 80.

On positive peaks of the AC chroma signal, transistor 34 is forward biased into its linear conduction region, causing a current flow from the collector 34*c* to the emitter 34*e* in proportion to the peak of the chroma signal. The amount of conduction pulls down the voltage at the collector 34*c*, which voltage is filtered by the pair of capacitors 70 and 72 to form a DC gain control voltage. The diode 80 provides DC restoration for the chroma signal because on negative excursions of the chroma signal, diode 80 will conduct. The Set-Up control 76 is adjusted to cause the transistor 34 to be biased as a stable amplifier.

The PCC transistor 34 is connected in shunt with the Chroma Control 30 when switch 66 is closed. Thus, the transistor 34 functions as a shunt regulator which limits the range of the manual Chroma Control. For example, when switch 66 is closed and a television viewer moves wiper 56 towards the regulated supple line 54, a more positive DC voltage is passed through resistor 58. However, the move positive voltage is coupled through switch 66 to junction 64, and thence through the bias path including resistor 74, 76 and diode 80 to further forward bias transistor 34, thereby tending to buck or drop the increased voltage at junction 64. Thus, the PCC acts as a shunt regulator which narrows the range of control provided by the manual potentiometer.

Having described the invention, the embodiments of the invention in which an exclusive property or privilege is claimed are defined as follows:

1. In a color television receiver having a chroma channel for processing a chroma video component of a composite color television signal, the chroma channel having a bias input for controlling the gain of the chroma channel in proportion to a DC voltage at the bias input, an automatic chroma control circuit for generating the DC voltage to control the gain of the chroma channel, comprising:

a controllable semiconductor device having at least a control electrode and an output electrode;

peak circuit means for directly driving the control electrode of the semiconductor device by peaks of the chroma video component from the output of the chroma channel to develop in the output electrode a current proportional to the peaks of the chroma video component;

integrating means coupled to the output electrode for developing said DC voltage with a magnitude proportional to the peaks of the chroma video component;

a manual chroma control means connected at all times to the bias input for developing an adjustable DC voltage having a magnitude proportional to a desired gain for the chroma channel; and means including a switch actuable for selectively coupling said integrating means and said controllable semiconductor device in shunt across said manual chroma control to form a shunt regulator means which decreases the range of the adjustable DC voltage developed by the manual chroma control while the switch is actuated, whereby deactuation of the switch increases the range of the adjustable DC voltage developed by the manual chroma control.

2. The automatic chroma control circuit of claim 1 wherein the peak circuit means includes a source of supply potential, diode means, and resistive means connecting said diode means between the supply potential and one of the electrodes of the semiconductor device to establish a peak set-up voltage.

3. The automatic chroma control circuit of claim 2 wherein said resistive means includes a variable resistor which forms a peak set-up control.

4. The automatic chroma control circuit of claim 1 wherein said peak circuit means includes chroma bandpass filter means coupled between the output of the chroma channel and the control electrode, said filter including at least one series capacitor.

5. In a color television receiveer having a chroma channel for processing a chroma video component of a composite color television signal to produce at an output an AC chroma signal having positive and negative excursions, an automatic chroma control circuit for generating a control voltage to control the gain of the chroma channel, comprising:

a controllable semiconductor device having at least a control electrode and an output electrode;

peak circuit means for directly driving the control electrode of the semiconductor device by peaks of only one of the excursions of the AC chroma signal from the output of the chroma channel to develop in the output electrode a current proportional to the peaks of the chroma video component, including a biasing network having a plurality of resistors and a diode coupled between said resistors and said control electrode for conducting on one of the excursions of the AC chroma signal to provide DC restoration for the AC chroma signal; and integrating means coupled to the output electrode for developing said control voltage with a DC amplitude proportional to the peaks of said one of the excursions of the AC chroma signal.

6. The automatic chroma control circuit of claim 5 wherein said integrating means comprises capacitor means to integrate the current flow in the controllable semiconductor device in order to develop said DC control voltage.

* * * * *